Figure 1:
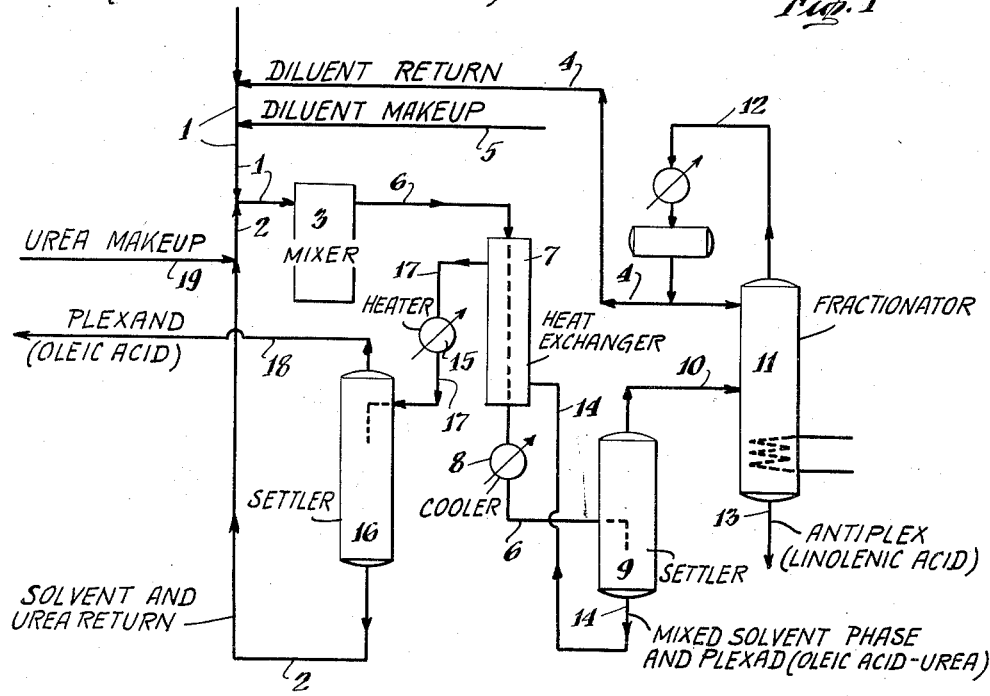

Aug. 21, 1956 E. GORIN 2,759,918
SEPARATION OF HYDROCARBONS AND HYDROCARBON DERIVATIVES
HAVING DIFFERENT DEGREES OF CARBON-CARBON UNSATURATION
Original Filed Sept. 13, 1949 2 Sheets-Sheet 1

INVENTOR.
Everett Gorin
BY Robert D. Flynn
AGENT

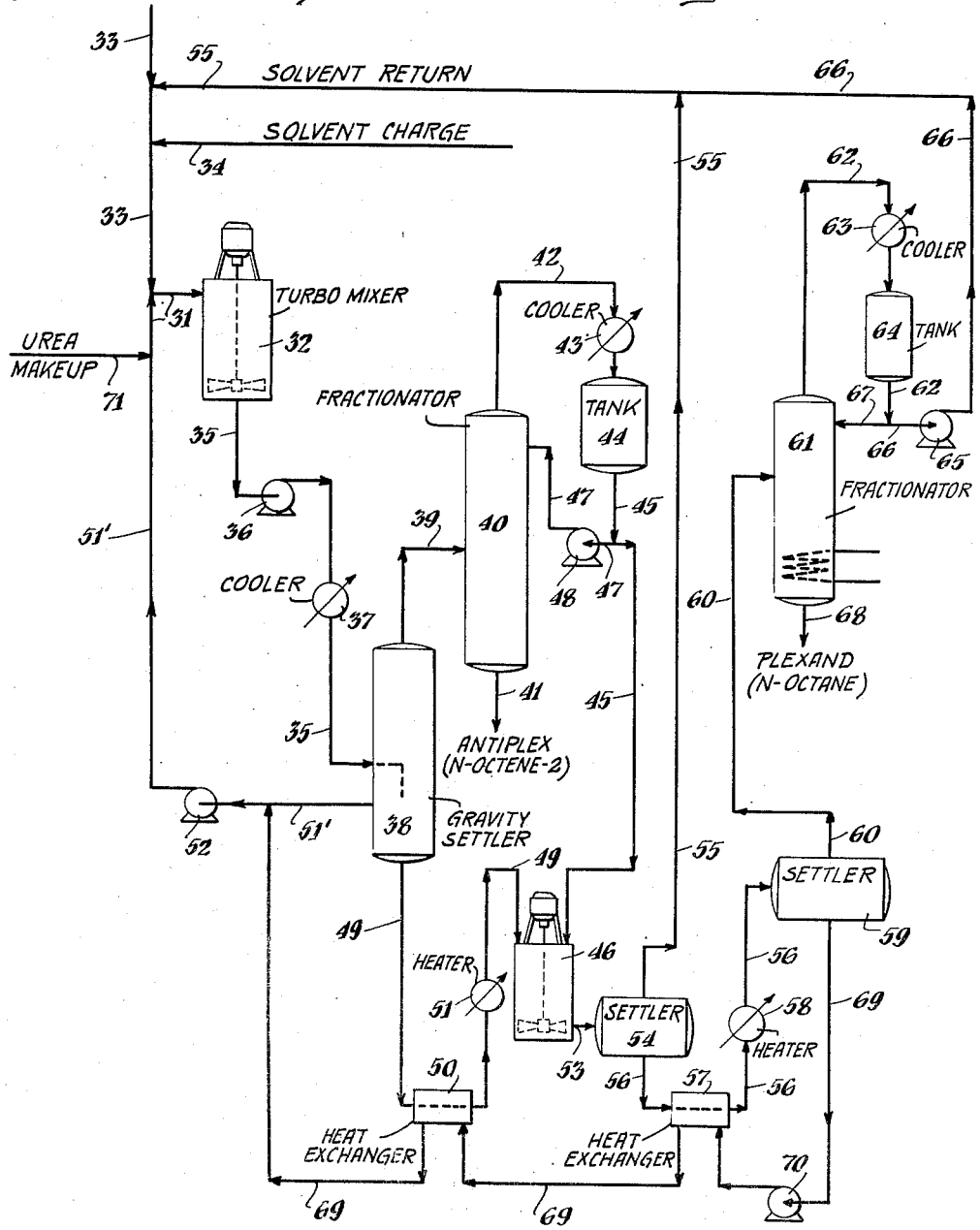

2,759,918

SEPARATION OF HYDROCARBONS AND HYDROCARBON DERIVATIVES HAVING DIFFERENT DEGREES OF CARBON-CARBON UNSATURATION

Everett Gorin, Pittsburgh, Pa., assignor to Socony Mobil Oil Company, Inc., a corporation of New York Application January 15, 1952, Serial No. 266,547, which is a division of application Serial No. 115,518, September 13, 1949, now Patent No. 2,642,423, dated June 16, 1953. Divided and this application February 16, 1954, Serial No. 410,573

5 Claims. (Cl. 260—96.5)

This invention has to do with the separation of hydrocarbons and hydrocarbon derivatives of different molecular configuration from mixtures containing the same, and also has to do with the preparation of new and novel compositions.

This application is a division of application Serial No. 266,547, filed January 15, 1952, which, in turn, is a division of application Serial No. 115,518, filed September 13, 1949, now Patent No. 2,642,423.

I. FIELD OF INVENTION

Numerous processes have been developed for the separation of hydrocarbons and hydrocarbon derivatives of different molecular configuration by taking advantage of their selective solubility in selected reagents or solvents from which they may later be separated. Exemplary of hydrocarbon separation procedures is the Edeleanu process, wherein paraffinic materials are separated from aromatics by virtue of the greater solubility of aromatics in liquid sulfur dioxide. Lubricant oil solvent refining processes, solvent deasphalting, solvent dewaxing and the like are further examples of the separation of hydrocarbons of different molecular configuration. Typical of selective solvent procedures for separating hydrocarbon derivatives is the separation of paraffin wax, monochlorwax and polychlorwaxes, with acetone as the selective solvent.

This invention is concerned with the general field outlined above, but based upon a different and little-known phenomenon, namely, the differing ability of hydrocarbons and hydrocarbon derivatives to enter into and to be removed from certain crystalline complexes. As used herein, the term "complex" broadly denotes a combination of two or more compounds.

This invention is predicated upon the knowledge that urea forms complex crystalline compounds to a varying degree with various forms of hydrocarbons and hydrocarbon derivatives.

II. PRIOR ART

For some years it has been known that various isomers of aromatic hydrocarbon derivatives form complexes with urea. Kremann (Monatshefte f. Chemie 28, 1125 (1907)) observed that complexes, designated as "double compounds," of urea and the isomeric cresols are stable at different temperatures. Schotte and Priewe (1,830,859) later separated meta-cresol from the corresponding para isomer by selectively forming a meta-cresol-urea complex, which was described as an "addition compound"; the latter compound was separated from the para isomer and then split up by distillation or with water or acid to obtain pure meta-cresol. The "addition compound" of meta-cresol and urea was shown thereafter to have utility as a disinfectant (Priewe—1,933,757). Bentley and Catlow (1,980,901) found a number of aromatic amines containing at least one basic amino group capable of forming "double compounds" with certain isomeric phenols. It has also been shown that trans-oestradiol can be separated from the corresponding cis-compound by forming a difficultly soluble compounds of urea and trans-oestradiol (Priewe—2,300,134).

The forces between urea and the compounds of the foregoing complexes are due to specific chemical interaction between the various functional groups.

One heterocyclic compound, 2:6 lutidine, has been found to form a crystalline compound with urea, thus affording a means of separating the lutidine from beta- and gamma-picolines (Riethof—2,295,606).

Comparatively few aliphatic hydrocarbon derivatives have been known to date to form complex compounds with urea. In German patent application B 190,197 IV d/12 (Technical Oil Mission, Reel 143; Library of Congress, May 22, 1946) Bengen described a method for the separation of aliphatic oxygen-containing compounds (acids, alcohols, aldehydes, esters and ketones) and of straight chain hydrocarbons of at least six carbon atoms from mixtures containing the same, the method being predicated upon the ability of such compounds and hydrocarbons to form "Additions-Produkt" with urea. In the Technical Oil Mission translation of the Bengen application, however, the urea complexes were designated "adducts," which term apparently stems from the anglicized "addition product."

III. DEFINITIONS

From the foregoing discussion of prior art (II), it will be clear that a variety of terms have been applied to urea complexes. The latter have been rather loosely described as "double compounds," "addition compounds," "difficultly soluble compounds," "Additions-Produkt," and "adducts." All of these terms are somewhat ambiguous in that they have also been used to describe products or complexes of different character than the urea complexes under consideration. This is particularly so with the term "adduct," and the related term "unadducted material." While the term "adduct" is simple and convenient, it is an unfortunate designation, inasmuch as it confuses these complexes with other substances known in the chemical art. Specifically, "adduct" has been applied to Diels-Alder reaction products, formed by reaction of conjugated diolefins and olefins and their derivatives. As is well known, Diels-Alder products, as a rule do not revert to their original constituents when heated or treated with water, acids, solvents, etc. Moreover, the term "adduct" has been defined earlier as "The product of a reaction between molecules, which occurs in such a way that the original molecules or their residues have their long axes parallel to one another." (Concise Chemical and Technical Dictionary.) Further ambiguity is introduced by the term "adduction," which has been defined as "oxidation." (Hackh.)

To avoid the foregoing conflicting terminology, several related terms have been coined to define with greater specificity the substances involved in the phenomenon under consideration. As contemplated herein and as used throughout the specification and appended claims, the following terms identify the phenomenon:

Plexad—a revertable associated complex comprising a plexor, such as urea, and at least one other compound; said plexad characterized by reverting or decomposing, under the influence of heat and/or various solvents, to its original constitutents, namely, a plexor and at least one plexand;

Plexand—a compound capable of forming a plexad with a plexor, such as urea; compounds of this character differ in their capacity to form plexads, depending upon various factors described hereinafter;

Antiplex—a compound incapable of forming a plexad with a plexor;

Plexor—a compound capable of forming a plexad with a plexand; such as urea;

Plexate—to form a plexad;

Plexation—the act, process or effect of plexating.

IV. STATEMENT OF INVENTION

It has now been discovered that, by selective plexation with urea, certain aliphatic hydrocarbons and aliphatic hydrocarbon derivatives of varying degrees of saturation (or unsaturation) can be separated, in the form of their corresponding plexads, from a mixture containing the same. One particular selective plexation involves separation of more saturated straight chain hydrocarbons and hydrocarbon derivatives from less saturated straight chain hydrocarbon and hydrocarbon derivatives, for example, a saturated paraffin from a mono-olefin, particularly when the olefin group is relatively centrally positioned in the molecule; also a mono-olefin from a poly-olefin, particularly when the olefin groups are relatively centrally positioned and are spaced an appreciable distance from each other. Another selective plexation involves separation of a straight chain hydrocarbon, or hydrocarbon derivative, having a double bond at or close to a terminal carbon atom, from a hydrocarbon, or hydrocarbon derivative, having a double bond more centrally positioned in the hydrocarbon chain. The separation procedures are effective when the aliphatic hydrocarbons and aliphatic hydrocarbon derivatives present in the mixtures subject to plexation have the same or a different number of carbon atoms. Selective plexation is also effective when the aliphatic hydrocarbon derivatives have the same or different substituent groups.

As contemplated herein, the invention makes possible the separation of one or more plexands from a mixture containing the same, such plexand or plexands being separated in the form of a plexad or plexads which, as described in detail hereinbelow, revert to the plexor, urea, and the plexand or plexands under certain conditions. The separation, therefore, is an excellent means for obtaining, in pure or concentrated form, one or more plexands or antiplexes whichever is the desired material. The invention also provides a means of forming new compositions of matter, namely, a number of plexads which may be used as a source of a plexor, urea, or as a source of a plexand.

V. OBJECTS

It is an object of this invention, therefore, to provide an effective means for separating hydrocarbons and hydrocarbon derivatives of different degrees of saturation, or unsaturation, from mixtures containing the same.

It is also an object of this invention to selectively separate a straight chain saturated hydrocarbon from a mixture containing the same and a straight chain unsaturated hydrocarbon. A more particular object is the separation of a straight chain paraffin from a straight chain mono-olefin, especially when the olefin group is relatively centrally positioned in the molecule. A related object is the separation of a straight chain saturated paraffin derivative from a mixture containing the same and a straight chain unsaturated paraffin derivative. A particular object is the separation of a straight chain saturated acid from a straight chain unsaturated acid.

A further object is the provision of a selective separation of a straight chain mono-olefin from a mixture containing the same and a straight chain poly-olefin. A particular object is the separation of a straight chain mono-olefin from a straight chain diolefin, especially when the olefin groups are relatively centrally positioned and are spaced an appreciable distance from each other. A related object is the separation of a straight chain mono-olefinic paraffin derivative from a mixture containing the same and a straight chain poly-olefinic paraffin derivative. A more particular object is the separation of a straight chain mono-olefinic acid from a straight chain polyolefinic acid.

An additional object is the separation of a straight chain mono-olefin having the double bond at a terminal carbon atom, from a mixture containing the same and a straight chain mono-olefin having the double bond more centrally positioned in the hydrocarbon chain. A corresponding object is the separation of a straight chain mono-olefin having an internal double bond from a mixture containing the same and a straight chain mono-olefin having an internal double bond more centrally positioned in the chain.

Another object is the provision of a continuous method of separation of said plexands and antiplexes, which method is flexible, capable of relatively sharp separation, and not highly demanding of attention and of utilities such as heat, refrigeration, pumping power, and the like.

Still another object is to provide a plexand or plexands substantially free of an antiplex or antiplexes. A corresponding object is the provision of an antiplex or antiplexes substantially free of said plexand or plexands.

Another object is to provide a new and novel class or sub-classes of plexads comprising a plexand and urea.

Other objects and advantages of the invention will be apparent from the following description.

VI. INVENTION IN DETAIL

As indicated above, it has been found that the foregoing objects are achieved by selective plexation with urea (a plexor) of a plexand or plexands.

(1) Plexands

A plexand, as defined above, is a compound capable of forming a plexad with a plexor, such as urea. Contemplated herein as plexands are a variety of paraffinic compounds.

(a) *Paraffins.*—Bengen, identified above, has disclosed that straight chain paraffins having at least six carbon atoms per molecule form complexes, or as defined herein plexads, with urea. Such paraffins, therefore, are considered as plexands in the process of this invention.

Typical of such paraffins are the following:

n-Heptane
n-Octane
n-Nonane
n-Decane, etc.

(b) *Unsaturated compounds.*—It has now been found that normal, alpha olefins having no more than two additional non-terminal double bonds and at least about seven carbon atoms per molecule, are plexands. It has also been found that stronger plexads are formed of such normal, alpha olefins, than of the corresponding olefins having a double bond more centrally positioned in the carbon chain. In other words, the forces between urea and the olefin making for plexad formation, become progressively weaker as the double bond migrates towards the center of the molecule. Accordingly, normal, non-alpha olefins are considered herein as secondary plexands, as shown hereinbelow.

In addition, it has been discovered that the straight chain paraffins form somewhat stronger plexads with urea than do the straight chain, normal alpha mono-olefins which, in turn, form stronger plexads than the straight chain di-olefins. Further, under the same conditions, straight chain polyolefins containing three or more double bonds do not form plexads.

Representative normal, alpha olefin plexands are the following:

| | |
|---|---|
| 1-heptene | 1-pentadecene |
| 1-octene | 1-hexadecene |
| 1-nonene | 1-heptadecene |
| 1-decene | 1-octadecene |
| 1,3-decadiene | 1,17-octadecadiene |
| 1,4-decadiene | 1-nonadecene |
| 1,9-decadiene | 1-eicosene |
| 1-undecene | 1,19-eicosadiene |
| 1,10-undecadiene | 1-docosene |
| 1-dodecene | 1-tricosene |
| 1,11-dodecadiene | 1-tetracosene |
| 1-tridecene | 1-hexacosene (cerotene) |
| 1-tetradecene | 1-heptacosene |
| 1,4-tetadecadiene | 1-octacosene |

(c) *Terminally-substituted paraffins.*—As described in several related applications, Serial Numbers 115,511, now abandoned, 115,513, now Patent No. 2,642,422, 115,514, now abandoned, 115,515, now Patent No. 2,681,332, 115,516, now abandoned, 116,593, now Patent No. 2,681,334, and 115,517, now Patent No. 2,681,333, all filed September 13, 1949, certain terminally-substituted straight chain paraffins are plexands. These paraffinic compounds have been represented by general Formula A:

(A)  $X(CH_2)_n \cdot CH_3$ wherein $n$ is a whole number and wherein X is a substituent group of the character described below, with $n$ and X being interrelated.

The substituent group X can be an inorganic or organic group, such as illustrated by the following:

(a) Halogen substituent: F, Cl, Br and I
(b) Nitrogen-containing substituent: $NH_2$, $NH(R)$, $NR_2$, $NO_2$, NOH, CN, $CONH_2$, $CONH(R)$, $CONR_2$, CNO, CNS, NCO, NCS, etc., wherein R is a hydrocarbon radical;
(c) Sulfur-containing substituent: SH, SR, $SO_3H$, $OSO_3H$, $SO_2H$, $SO_2R$, SOR, wherein R is a hydrocarbon radical, $SO_2Z$, wherein Z is a halogen atom, etc.;
(d) Oxygen-containing substituent: OH, CHO, COOH, COOR, wherein R is a hydrocarbon group, CO, —O—, $CH_2OH$, $CH_2COOH$, etc.;
(e) Cyclic substituent: cycloalkyl such as cyclopropyl, cyclobutyl, cyclopentyl, cyclohexyl, cycloheptyl, chlorcyclohexyl, etc.; aryl, such as phenyl and chlorphenyl; hetero such as thienyl $C_4H_3S$, furyl $C_4H_3O$, pyrryl $C_4H_4N$, pyridyl $C_5H_4N$, thiazyl $C_3H_2NS$, pyrazolyl $C_3H_3N_2$, piperydyl $C_5H_{10}N$, etc.;
(f) Alkyl substituent: methyl;
(g) Alkenyl substituent: vinyl;
(h) Haloalkyl substituent: dichlormethyl $Cl_2CH$—, etc.

The substituent group (X) can be any of the types outlined above subject, however, to one important consideration, namely, that of geometrical size as related to the number of carbon atoms in the chain. The "width" of the substituent group is the geometrical feature to be considered, and this is the cross-section of the group taken in a direction perpendicular to the bond joining the group to the carbon chain. This distance is taken at the widest portion of the group and may be conveniently given a quantitative measure as the distance from between outer covalent radii of the two most widely separated atoms along the cross-section of the group where the covalent radii are those given by Pauling (Pauling—"Nature of the Chemical Bond," Cornell University Press, Ithaca, N. Y., 1939). The "width" determines the length of the carbon chain required to obtain plexation at about 25° C. with a saturated urea solution, a plexor. In the case of composite groups of the type —COY, —CH₂COY and —CH₂Y, wherein Y is a non-aliphatic radical such as chlorine or amino, the =C=O, —CH₂CO and —CH₂— constituents, respectively, are considered as part of the carbon chain and the "width" computed is that for the radical Y.

The "widths" of a number of typical groups computed according to the method given above are listed in order of size in Table I below:

TABLE I—"WIDTH" OF VARIOUS GROUPS IN A°

| | | | |
|---|---|---|---|
| —CN | 1.20 | —I | 2.66 |
| —F | 1.28 | —SH | 2.67 |
| —OH | 1.93 | —NO₂ | 3.32 |
| —COOH | 1.93 | —SO₃H | 3.69 |
| —Cl | 1.98 | thienyl | 4.38 |
| —NH₂ | 2.11 | cyclohexyl | 4.74 |
| —CONH₂ | 2.11 | phenyl | 5.15 |
| —Br | 2.28 | 2 or 3 methyl cyclohexyl | 5.49 |
| —CH₃ | 2.36 | O- or m-tolyl | 6.09 |

The correlation between the "width" of the terminal substituent and the length of the carbon chain required for plexad formation at 25° C. is an approximate one. This relationship depends to some extent upon the nature of the substituent as well as upon the "width" of the substituent. For example, in the case where two substituents are of the same size, the group which imparts a higher melting point to the substituted paraffin will form the stronger plexad, i. e. will form a plexad when the chain is somewhat shorter in length. Caproic acid, melting point —1.5° C., thus preferentially forms a plexad with saturated urea at 25° C., when admixed with n-hexyl alcohol, melting point —51.6° C.

Only the carbon atoms in the chain are considered to contribute to the chain length, that is, atoms such as oxygen, sulfur, nitrogen, etc., are not included in the atom total. Accordingly, then, the straight chain compounds contemplated herein include straight chain aliphatic hydrocarbons and straight chain aliphatic hydrocarbons in which one or more of the carbon atoms of the chain have been replaced by such atoms as oxygen, sulfur, nitrogen, and the like.

It is possible, however, to give the unequivocal limits for the relation between "width" of the terminal substituent and size of the carbon chain required for plexation with urea at 25° C. These limits are set forth in Table II below:

TABLE II.—CORRELATION BETWEEN "WIDTH" OF TERMINAL SUBSTITUENT AND MINIMUM CHAIN LENGTH FOR UREA PLEXATION AT 25° C.

| Group | "Width" (in A°) | Minimum Chain Length, Number of Carbon Atoms |
|---|---|---|
| 1 | <2.3 | 5–8 |
| 2 | 2.3–3.7 | 8–12 |
| 3 | 3.7–5.2 | 12–18 |
| 4 | >5.2 | >18 |

It is to be understood that these limits apply for plexation at temperatures of the order of about 25° C. The minimum number of carbon atoms in the chain is lower for plexation at lower temperatures, but generally not more than one or two carbon atoms lower; that is, with one less carbon atom the minimum number of carbon atoms is six. In the same vein, for an increase in temperature, a correspondingly higher number of carbon atoms will be required in the chain.

(a) Halogen compounds: n-heptyl fluoride, n-heptyl bromide, n-octyl chloride, n-octyl bromide, n-dodecyl iodide, n-hexadecyl chloride, n-hexadecyl bromide, n-octadecyl chloride, n-octadecyl bromide, etc.;
(b) Nitrogen-containing compounds:
Amino—n-octylamine; n-decylamine; n-hexadecylamine; n-octadecylamine; methyl, n-octylamine; butyl, n-octylamine;

Cyano—n-hexyl nitrile, n-octyl nitrile, n-tetradecyl nitrile, n-octadecyl nitrile, etc.;
Nitro—1-nitro-n-decane; 1-nitro-n-dodecane; 1-nitro-n-octadecane; etc.;
Amido—n-octanamide, n-dodecanamide, n-octadecanamide; N-methyl, n-octanamide; N-hexyl, n-decanamide; etc.;
Cyanate and isocyanate—n-hexyl cyanate, n-hexyl isocyanate, n-decyl cyanate, n-decyl isocyanate, n-hexadecyl cyanate, n-hexadecyl isocyanate, etc.
Thiocyanate and isothiocyanate—n-decyl thiocyanate; n-decyl isothiocyanate; n-octadecyl thiocyanate; n-octadecyl isothiocyanate; etc.

(c) Sulfur-containing compounds:
Mercapto—n-octyl mercaptan, n-dodecyl mercaptan, n-hexadecyl mercaptan, n-octadecyl mercaptan, etc.
Sulfido (SR)—methyl, n-octyl sulfiide; n-butyl, n-dodecyl sulfide; amyl, n-hexadecyl sulfide; etc.
Sulfato—n-dodecyl sulfate; n-hexadecyl sulfate; etc.
Sulfonyl halide—n-decyl sulfonyl chloride, n-dodecyl sulfonyl bromide, n-hexadecyl sulfonyl iodide, etc.

(d) Oxygen-containing compounds:
Hydroxy—n-heptanol-1; n-octanol-1; n-decanol-1; n-dodecanol-1; n-hexadecanol-1; octadecyl alcohol; etc.
Carboxyl—n-valeric acid; caproic acid; n-heptylic acid; caprylic acid; pelargonic acid; lauric acid; myristic acid; palmitic acid; stearic acid; arachidic acid; behenic acid; lignoceric acid; cerotic acid; etc.
Keto—di(n-butyl) Ketone; methyl, n-heptyl Ketone; ethyl, n-hexyl Ketone;
Ether—di(n-butyl) ether; ethyl, n-pentyl ether; di-(n-pentyl) ether; etc.
Ester—di(n-amyl) succinate; n-butyl stearate; etc.

(e) Cyclic substituent: 1-cyclopropyl-n-octadecane; 1-cyclohexyl-n-hexadecane; 1-phenyl-n-octadecane; 1-thienyl-n-octadecane; etc.

(f) Alkyl substituent: n-octane; 2,2-dimethyl-n-octadecane; etc.

(g) Haloalkyl substituent: 1,1-dichlormethyl-n-decane, etc.

It is to be understood that terminally-substituted straight chain compounds containing a second terminal substituent on the opposite terminal carbon atom, are also contemplated herein as plexands. Such disubstituted compounds are also subject to approximately the foregoing relationships of terminal group "width" and chain length. Compounds of this character are represented by the following general Formula A':

(A')   X(CH₂)ₙX' wherein $n$ is a whole number, and X and X' are the same or different and as defined above.

Illustrative of such compounds are the following:

1,10-dichlor-n-decane;
1,8-n-octane diamine;
1,10-n-decane diamide;
1,12-n-dodecane dithiol;
1,18-disulfo-n-octadecane; etc.

(d) *Terminally-substituted olefins.*—Straight chain olefinic compounds having a terminal substituent and not more than two non-terminal double bonds, are also considered as plexands herein. The terminal substituents are of the character described above in connection with the related paraffins VI(1)(c). Here too, the same relationship of "width" of terminal substituent and carbon chain length is an important consideration. The relationship shown above is in operation with the olefinic compounds subject, however, to some influence of the degree of unsaturation. In some cases, the presence of one double bond will require a chain of one or two more carbon atoms than are shown in connection with VI(1)(c).

By way of illustration, the following terminally-substituted, normal olefins are typical plexands:

1-chloro-n-octene-2;
1-amino-n-decene-2;
n-Octadeceneamide;
Oleic acid;
Oleyl alcohol;
n-Octadecenyl mercaptan.

Included also as plexands are terminally-substituted, straight chain non-alpha olefins having less than three double bonds per molecule. Here too, the "width" of the substituent group and the number of carbon atoms in the chain are interrelated, and the values given above for compounds represented by general Formula A are substantially in operation.

By way of illustration, the following compounds typify terminally-substituted, straight chain non-alpha olefins:

n-9-hexadecenylamine;
n-9-octadecenylamine;
n-9,12-octadecadienylamine;
n-9-octadecenamide;
Oleyl alcohol;
Delta-9-10-decenylic acid;
Delta-9-10-dodecenylic acid;
Oleic acid;
Ricinoleic acid;
Linoleic acid;
2-ethylhexyl-n-octyl fumarate;
Di(n-hexyl) fumarate;
Di(n-octyl) fumarate;
Di(n-hexyl) maleate;
Di(n-octyl) maleate;
n-Butyl oleate; etc.

It should be noted that 2-ethylhexyl, n-octyl fumarate forms a plexad with urea, thus demonstrating that a relatively small degree of branching can be tolerated, that is, one ethyl group in a linear chain containing eighteen carbon atoms. However, di(2-ethylhexyl) fumarate does not form a plexad under the same conditions, apparently having too high a degree of branching.

Another feature to be noted is the failure of di(n-amyl) fumarate to form a plexad with urea at 25° C. This demonstrates the insufficiency of the amyl chains, for at least one of the chains should contain at least six carbon atoms. For example, di(n-hexyl) fumarate forms a plexad under the same conditions. Dioleyl maleate, however, does not form a plexad under these conditions, evidence that the degree of unsaturation, three double bonds, is too high for plexad formation.

It is to be understood that terminally-substituted straight chain olefins containing a second terminal substituent attached to the opposite terminal carbon of the chain, are also contemplated as plexands. These disubstituted olefins are subject, too, to the terminal group "width" and chain lengths applicable to the substituted olefins above.

Typical of disubstituted olefins having at least one terminal substituent are the following:

Chloro oleic acid;
Ricinoleic acid; etc.

(2) *Secondary plexands*

The compounds described below are secondary plexands in the processes of this invention.

(a) *Paraffins.*—Paraffins serving as secondary plexands are primarily straight chain in character with but little branching. In general, these paraffins should contain at least about ten carbon atoms in a straight chain, with the branch chain being attached to another carbon atom of the chain and with the branch chain having less than three carbon atoms.

Illustrative of such paraffins is 2-methyl-n-hexadecane.

(b) *Olefins.*—Straight chain, non-alpha olefins having less than three double bonds and having at least about seven carbon atoms per molecule, form plexads with urea. As indicated above, plexads of such olefins are not as strong as those formed with the alpha olefins defined above. The difference in the forces attending a plexad of a 1-olefin and a plexad of a 2-olefin is, therefore, substantially less than the corresponding difference with a 1-olefin and a 4-, 5- or 6-olefin. Applying this relationship, a more effective separation is made of a 1-olefin from a 4-olefin, than of a 1-olefin from a 2-olefin. In the latter instance, however, a considerable upgrading of the 1-olefin content is realized, particularly by repeated contact with urea.

Representative non-alpha olefins behaving as secondary plexands are the following:

| | |
|---|---|
| 2-octene | 2,8-decadiene |
| 3-octene | 2-undecene |
| 4-octene | 5-undecene |
| 2-nonene | 6-dodecene |
| 3-nonene | 2,6-dodecadiene |
| 4-nonene | 6-tridecene |
| 2-decene | 7-tetradecene |
| 3-decene | 8-heptadecene |
| 4-decene | 9-octadecene |
| 5-decene | |

Both the cis and trans form of the olefins are contemplated herein; however, the trans compounds will generally form the stronger plexad.

(c) *Non-terminally substituted compounds.*—Secondary plexands also include non-terminally substituted, straight chain compounds characterized by general Formula B:

(B)  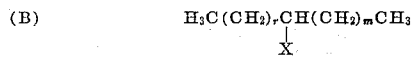

wherein $r$ and $m$ are integers, the sum of which is equal to or different than $n$-2, and $n$ and X are as defined above.

The "length," rather than the "width," of the substituent group (X) roughly determines the minimum carbon chain length required for plexation of a secondary plexand. The "length" is the projection along the bond joining the group to the parent hydrocarbon of the distance from the center of the carbon atom to which the group is attached, to the center of the atom whose covalent radius shell extends furthest in the direction of said bond, plus the covalent radius of said bond. The minimum chain length is also to some extent a function of the position substituted as well as of the chemical nature of the group. Thus, in compounds of this type, the minimum chain length required for plexation is determined by the "length" of group $H_3C(CH_2)_r-$, if $r$ is small enough so that this alkyl group is shorter in "length" than the substituent group (X). It is possible, bearing this relationship in mind however, also to give rather wide limits in the correlation of group "length" with the minimum chain length required for plexation. The "lengths" of various groups are given in Table III, below, while the correlation of chain lengths with group "lengths" is given in Table IV, also provided below:

TABLE III.—"LENGTHS" OF VARIOUS GROUPS IN A°

| | | | |
|---|---|---|---|
| —F | 2.06 | —SH | 2.85 |
| —OH | 2.10 | —Br | 3.05 |
| —NH₂ | 2.17 | —CH₂Cl | 3.11 |
| —CH₃ | 2.31 | —C₂H₅ | 3.19 |
| —CH₂OH | 2.43 | —CN | 3.25 |
| —NO₂ | 2.61 | —SO₃H | 3.37 |
| —CHO | 2.70 | —I | 3.43 |
| —Cl | 2.76 | -Cyclohexyl (average) | 5.09 |
| —COOH | 2.81 | -Phenyl | 5.09 |

TABLE IV.—CORRELATION BETWEEN "LENGTH" OF NON-TERMINALLY SUBSTITUTED GROUPS AND MINIMUM CHAIN LENGTH REQUIRED FOR UREA PLEXATION AT 25° C.

| Group | "Length" in A° | Minimum Chain Length Number of Carbon Atoms |
|---|---|---|
| 1 | <2.30 | 7–10 |
| 2 | 2.30–2.50 | 10–13 |
| 3 | 2.50–2.80 | 13–18 |
| 4 | 2.80–3.20 | 18–24 |
| 5 | >3.20 | >24 |

Again, it is to be understood that these limits apply for plexation at about 25° C. Here too, the minimum number of carbon atoms in the chain is somewhat lower for plexation at lower temperatures, but generally not more than one or two carbon atoms lower. In the same vein, a correspondingly higher number of carbon atoms will be required in the carbon chain for a rise in temperature.

Secondary plexands represented by general formula (B), above, are typified by the following:

2-chloro-n-tetracosane;
2-bromo-n-tetracosane;
2-amino-n-decane;
2-nitro-n-octadecane;
n-octanol-2; etc.

(3) *Antiplex*

An antiplex, as defined above, is a compound incapable of forming a plexad with a plexor, such as urea.

Compounds which have been found to behave as antiplexes in the sense that they are incapable of forming a plexad with urea at about 25° C., include:

| | |
|---|---|
| 2-ethylhexene-1 | n-butyl amide |
| diisobutylene | n-butyric acid |
| triisobutylene | n-butyl alcohol |
| dioleyl maleate | n-amyl alcohol |
| n-butyl bromide | n-hexyl alcohol |
| n-butylchloride | 1-thienyl-n-dodecane |
| n-amyl chloride | |

(4) *Plexor*

The plexor used herein is urea, which is in solution in a single- or multiple-component solvent. This solution should range from partially saturated to supersaturated at the temperature at which it is contacted with a plexand or with a mixture containing one or more plexands and antiplexes, and, in many cases, it will be found convenient to suspend a further supply of urea crystals in the solution, handling it as a slurry. For gravity or centrifugal separation, it is convenient to use a solvent of such a specific gravity that after the formation of a desired amount of plexad, the specific gravity of the solvent phase will be different from that of the plexad phase and of the antiplex phase to a degree sufficient to permit separation by gravity, centrifuging, etc.

The solvent should be substantially inert to the plexand and to the compounds of the mixture and also to the urea. Preferably, it should also be heat stable, both alone and in contact with urea, at temperatures at which the desired plexad is not heat stable.

As indicated above, the solvent may be either single- or multiple-component. It is sometimes convenient, particularly where the plexad is separated by gravity, to utilize a two-component system, as water and an alcohol, glycol, amine or diamine, and preferably a lower aliphatic alcohol such as methanol or ethanol, or a water-soluble aliphatic amine such as piperidine. Such a solvent, partially saturated to supersaturated with urea, lends itself readily to a continuous process for separation by plexation.

Solutions containing sufficient water to minimize the solubility of the hydrocarbon derivatives in the urea solvent, are often employed. The minimum quantity of water required in such instances depends upon the polarity and the molecular weight of the hydrocarbon derivative, or plexand, being treated and, in general, this quantity will be greater with more polar plexands, and with lower molecular weight compounds.

In certain cases the use of single-component solvents is advantageous. Single-component solvents other than alcohols may be employed, although they are normally not as useful as the lower aliphatic alcohols. Glycols may be employed as single solvents, yet ethylene glycol is generally not suitable in gravity separation operations due to the high density of the urea-saturated solvent. The higher glycols and particularly the butylene glycols may be advantageously employed. Diamines such as diaminoethane, -propane and -butane may likewise be employed. Additional useful solvents include formic acid, acetic acid, formamide, acetonitrile, branched chain hydrocarbons, di-alkyl ethers, esters of carboxylic acids, and alkyl halides; although formic acid, acetic acid and formamide are subject to the same limitation as ethylene glycol.

Solvents generally useful when mixed with sufficient water, ethylene glycol or ethylene diamine, to render them substantially insoluble in the derivatives being treated, are selected from the class of alcohols such as methanol, ethanol, propanol, etc.; ethers such as ethylene glycol dimethyl ether; and amines such as trimethylamine, hexyamine, piperidine. When gravity separation is employed, the mixed solvent is preferably subject to the restriction that the density after saturation with urea must be less than 1.0—1.1.

(5) Typical separations

In order that this invention may be more readily understood, typical separations are described below with reference being made to the drawings attached hereto.

(a) *Separation of more highly unsaturated compound from less highly unsaturated compound.*—The procedure which may be employed in effecting the separation of a more highly unsaturated compound from one less unsaturated, may be essentially the same as that described in copending application Serial No. 4997, filed January 28, 1948. The plexand obtained in decomposing the plexad obtained in a urea treatment of a mixture of such compounds is very pure provided that only the less unsaturated compound forms a plexad and provided the plexad be carefully freed of occluded antiplex before it is decomposed. For example, substantially pure oleic acid is separated from the plexad obtained in the treatment of a mixture of the same and linolenic acid, for the latter does not form a plexad.

In Figure 1, a charge comprising a plexand and an antiplex, for example oleic acid and linolenic acid, respectively, enters through line 1, to be contacted with urea solution from line 2, and the charge and solution are intimately mixed in mixer 3. In case the charge undergoing treatment is rather viscous at the temperature of plexad (oleic acid-urea) formation, it is advisable to provide a diluent, such as for example, a naphtha cut which may be recycled within the process, as described later, and joins the charge from line 4. Diluent make up is provided by line 5.

From mixer 3, wherein there is achieved an intimate mixture of urea solution and charge, the mixture flows through line 6, heat exchanger 7, and cooler 8 into settler 9. There may be some or a good portion of plexad (oleic acid-urea) formed in mixer 3, but in general, it is preferred to operate mixer 3 at a temperature somewhat above that conducive to heavy formation of plexad. Then in heat exchanger 7, the temperature of the mixture is reduced, and in cooler 8 adjusted, so that the desired plexad is formed. It will be recognized that this showing is diagrammatic, and that the heat exchangers and coolers, heaters, etc., shown will be of any type suitable, as determined by the physical characteristics of the materials being handled.

For the mixture in question, temperatures of operation in the range of 25–50° C. are most suitable. When relatively low molecular weight compounds, for example those containing from 6–10 carbon atoms per molecule, saturated urea solutions in polar solvents are employed at temperatures from —10° C. to 20° C. When the compounds contain from 10–16 carbon atoms per molecule, saturated urea solutions are also employed, but at temperatures in the range of 15° C.–30° C. It should be noted, however, that many compounds such as the esters of stearic acid form very strong plexads; when treating such compounds, it is desirable to carry out the separation with a urea solution containing from 40–80 per cent of the amount of urea required for saturation.

From cooler 8, the plexad-containing mixture flows into settler 9. This settler is preferably so managed that there is an upper phase of antiplex (linolenic acid), an intermediate phase of urea solution, and a lower region containing a slurry of plexad in the urea solution. The incoming mixture is preferably introduced into the solution phase, so that the antiplex may move upward and plexad downward, through some little distance in the solution, to permit adequate separation of plexad from antiplex and antiplex from plexad.

Antiplex will be removed from settler 9 by line 10 and introduced into fractionator 11, wherein the diluent is removed, pass overhead by vapor line 12 and eventually to use through line 4. Recovered antiplex (linolenic acid) passes from the system through line 13. Obviously if no diluent be used, fractionator 11 will be dispensed with.

Plexad and urea solution, withdrawn from settler 9 through line 14 are passed through heat exchanger 7 and heater 15 to enter settler 16 through line 17. In this operation, the temperature is so adjusted that the plexand (oleic acid) is freed from the plexad and, in settler 16, the plexand rises to the top to be recovered from the system by means of line 18. The urea solution, thus reconstituted to its original condition by return to it of that portion of the urea which passed into plexad, is withdrawn from settler 16 by line 2 and returned to process. Naturally, in a process of this kind there are minor mechanical and entrainment losses of urea solution, etc., and urea solution make up is provided for by line 19.

Figure 2:
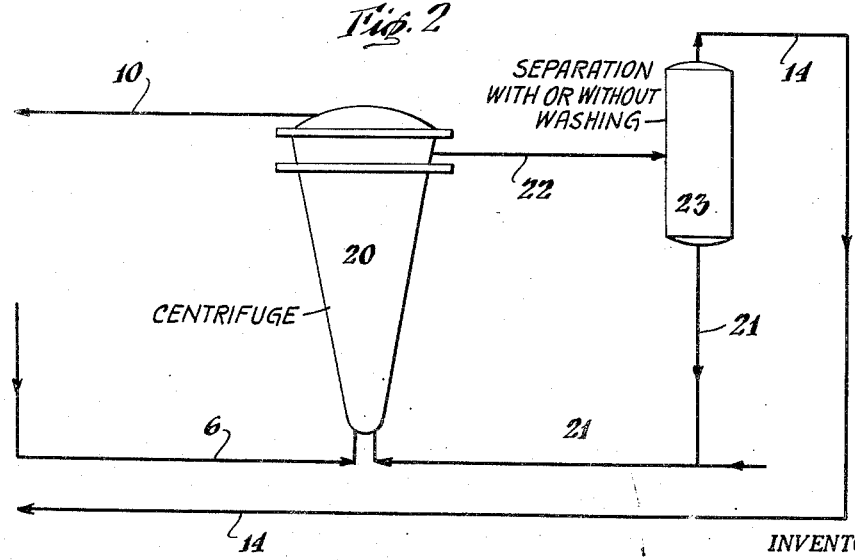

In many cases, the separation of plexad and solution from antiplex may be conducted with greater facility in a centrifuge operation. Such a setup is shown in Figure 2, wherein only the equivalent of that portion of Figure 1 centering about settler 9 is reproduced. Again in diagram form, the coolex mixture containing antiplex, plexad and urea solution enters centrifuge 20 through line 6. In many cases, it will be desirable to utilize a carrier liquid in known manner in this operation and that liquid may be introduced by line 21. Antiplex will be carried off through line 10, and plexad, urea solution, and carrier, if present, pass through line 22 to a separation step, which may include washing and may be carried out in a settler, a filter, or another centrifugal operation, which operation is indicated diagrammatically at 23. Carrier liquid, if used, returns through line 24, and urea solution and plexad pass through line 14. Note: Lines 6, 10 and 14 are the same lines, for the same functions, as in Figure 1 and are identically numbered.)

(b) *Separation of saturated paraffin from olefin.*—In the case where a straight chain saturated paraffin and a straight chain olefin present in a mixture each form a plexad, a concentration of the saturated paraffin will be obtained. The sharpness of separation will be greater, the greater the difference in the strength of the plexads formed with the two types of pure compounds. In general, this will be greater, the shorter the carbon chain length of the compounds and the more centrally positioned the double bond of the olefin. For example, a more concentrated n-octane can be obtained from a mixture of the same and n-octene-2; whereas, as upgrading of n-octane content is obtained with a mixture of the same and n-octene-1. Also, it is more difficult to obtain separation between n-dodecane and n-dodecene-2, than between n-octane and n-octene-2.

The following serves to illustrate a procedure for obtaining separation between a plexand, n-octane, and a secondary plexand, n-octene-2. This procedure is similar to a sweating or a solvent sweating procedure used in the refining of slack waxes, as is shown diagrammatically in Figure 3.

In Figure 3, a slurry of solid urea in a saturated urea solvent, which is preferably an aqueous alcoholic solution, is pumped from line 31 into a turbo mixer 32 where it is agitated with a mixture of n-octane and n-octene-2 (hereinafter referred to for simplicity as plexand and antiplex, respectively), which enters through line 33. An immiscible solvent charged through line 34 is also preferably employed; such as a light cut from a straight run naphtha in case the plexand and antiplex have (1) a relatively high viscosity; (2) and appreciable solubility in the urea solvent; or (3) greater density than the urea solvent. The amount of excess solid urea employed should be sufficient so that after the plexation is completed the urea solvent remains substantially saturated with urea.

Internal cooling means may be employed in 32 to further cool the mixture and remove the heat evolved during the plexation. The temperature employed in 32 will depend upon the chain length of the plexand and antiplex. If the chain length is such that it is not more than one or two carbon atoms greater than the minimum required to obtain plexation with the pure plexand at 25° C., then temperatures in the range of −10° C. to +20° C. should be employed. If the chain length is from two to six carbon atoms greater than the minimum, temperatures in the range of 15° C.–30° C. should be employed; and if the chain length is greater than six carbon atoms beyond the minimum, temperatures from 25° C.–50° C. are used. It will be apparent, then, that conditions of operation vary considerably, conditions selected being those appropriate for the formation of the desired plexad or plexads.

The slurry of plexad, urea solvent and antiplex is pumped, by means of pump 36, through line 35 and cooler 37 wherein it may be further cooled if desired, and into gravity settler 38. In settler 38 the antiplex plus naphtha solvent rises to the top and is withdrawn through line 39 into fractionator 40. The antiplex, predominantly n-octene-2, is removed as bottoms from fractionator 40 through line 41. The naphtha solvent is taken from fractionator 40 through line 42, cooler 43, tank 44 and line 45 to be employed in solvent sweating zone 46. Naphtha solvent may also be recycled to fractionator 40 through line 47, by means of pump 48.

In settler 38, the slurry of plexad in urea solvent is taken off through line 49, heat exchanger 50 and heater 51 in solvent sweating zone (or mixer) 46. A portion of the clear urea solvent may be removed from the center of 38 and recycled, through line 51 and pump 52, to mixer 32 if desired.

It is to be understood that the gravity settler 38 may be replaced by other separation means such as a centrifuge or rotary filter, etc.

The mixture of solvent and plexad is heated in solvent sweating zone 46 to a temperature sufficient to decompose the major portion of the plexad of the n-octene-2, while preserving the major portion of the plexad of n-octane.

The temperature employed in zone 46 is related to that employed in mixer 32, and will generally be maintained from 10° C. to 20° C. higher in zone 46 than in mixer 32.

The partially decomposed plexads, urea solvent, and naphtha mixture is passed from zone 46 through line 53 to settler 54. The naphtha containing plexand, n-octane, and some antiplex, n-octene-2, is recycled through lines 55 and 33 to mixer 32. The slurry of undecomposed plexad is withdrawn from the bottom of settler 54 through line 56, heat exchanger 57, heater 58 into settler 59. The plexad is thus heated hot enough to cause complete decomposition or reversion of the plexads and solution of the urea in the urea solvent. Temperatures of the order of 55–85° C. are generally suitable.

Plexand, n-octane, contaminated with naphtha which had been occluded on the corresponding plexad (n-octane-urea) is withdrawn through line 60 into fractionator 61. Naphtha is taken off overhead from fractionator 61 through line 62, cooler 63, tank 64, pump 65 and lines 66 and 55, to mixer 31. A portion of the naphtha may also be recycled to fractionator 61 through line 67. Plexand, n-octane, is recovered as bottoms through line 68.

Urea solution is recycled from the bottom of settler 59 through line 69, pump 70, heat exchangers 57 and 50, and line 51.

Plexand of any desired purity may be obtained by either: (1) increasing the fraction of the total plexad decomposed in the solvent sweating zone (46), or (2) including a multiplicity of alternating solvent sweating zones and settling zones (54) operating in series.

VII. ILLUSTRATIVE EXAMPLES

The following examples serve to illustrate and not in any sense limit, the present invention.

(a) *Separation in n-octene-1 and n-octene-2.*—A mixture, 20 parts by volume, comprising 50 volume per cent each of n-octene-1 and n-octene-2, was agitated at 25° C. with 150 parts by volume of a saturated aqueous urea solution. The resulting mixture was allowed to stand for about 16 hours and then filtered. The recovered plexad was decomposed by contact with water. The hydrocarbon recovered from the plexad comprised 13.5 parts by volume was richer in n-octene-1 than the original mixture, namely 69 volume per cent of n-octene-1.

(b) *Separation of n-octane from n-octene-1.*—Six parts by volume of a 50–50 volume per cent mixture of n-octane and n-octene-1, was agitated for 15 minutes at 25° C. with 30 parts by volume of a 67 per cent aqueous methanol saturated with urea and containing three parts by weight of excess solid urea. The resulting mixture was centrifuged, the upper layer poured off, and the hydrocarbon recovered from the plexad by decomposition with water. The recovered hydrocarbon, 1.5 parts by volume, contained 55 per cent of n-octane.

(c) *Separation of n-octane from n-octene-2.*—The example shown above in (b) was repeated with a mixture containing 50–50 volume per cent of n-octane and n-octene-2. Here, the hydrocarbon recovered from the plexad, 1.5 parts by volume, contained 61 per cent of n-octane.

(d) *Separation of n-butyl stearate from n-butyl oleate.*—A solution of 4 parts by volume of n-butyl stearate and 4 parts (volume) of n-butyl oleate in 92 parts (volume) of "isooctane," was agitated at 50° C. for 30 minutes with 25 parts (volume) of an aqueous methanol solution saturated with urea at 65° C. The resulting plexad layer was separated from the mixture, and decomposed by contacting the same with water. The ester recovered from the plexad contained 2 parts (volume) of butyl stearate and 0.3 part (volume) of butyl oleate.

The same ester solution was stirred at 50° C. for 150 minutes with 100 parts by volume of the same urea solution. In this instance, the recovered ester contained 3.75 parts (volume) of butyl stearate and 1.4 parts (volume) of butyl oleate. The antiplex contained 0.25 part of butyl stearate and 2.6 parts of butyl oleate.

The equilibrium concentrations of butyl stearate and of butyl oleate are shown by the following. Butyl stearate in "isooctane" solvent on repeated treatment with a saturated solution of urea in methanol, can be removed to a concentration below 0.1 per cent by volume at 25° C. and to a concentration of 0.6 per cent at 50° C. In contrast, butyl oleate can be reduced in concentration to 0.8 per cent (volume) at 25° C. and 4.1 per cent at 50° C.

(e) *Separation of di-(n-hexyl) succinate from di-(n-hexyl) maleate.*—The separation of saturated from unsaturated compounds is further illustrated by the experimental observation that the equilibrium concentration in the urea plexation of di-(n-hexyl) succinate is below 0.1 per cent ( volume) at 25° C., and only 3.5 per cent (volume) at 25° C. for di-(n-hexyl) maleate.

VIII. UTILITY

From the foregoing description, it will be apparent that the invention has considerable application in the chemical and petroleum arts. For example, hydrocarbon mixtures containing straight chain paraffins, olefins and polyolefins can be separated into straight chain paraffins, straight chain olefins and straight chain polyolefins, respectively.

Also, the invention is useful in effecting the separation of fatty acids (and their esters) of different degrees of unsaturation, such as those derived from various vegetable oils. This is particularly advantageous in providing concentrated drying oils or acids, relatively free of the non-drying oils and acids for the coating and resin industries. Thus, a mixture of stearic, oleic, linoleic and linolenic acids, or their esters with monohydric or dihydric alcohols, can be separated into their individual components, or into fractions relatively rich in the saturated components, and those rich in the more unsaturated components.

Another application is in making possible the separation of various long-chain saturated amines or amides from the related unsaturated amines or amides. This is illustrated by the separation of n-octadecylamine from mixtures containing the same and n-octadecenylamine.

Still another application of the invention is in conjunction with the process described in related application Serial Number 115,512, filed September 13, 1949, and now abandoned, wherein thiourea is shown as a plexor with highly-branched chain paraffins and highly-branched chain olefins as plexands. For example, with a mixture of straight chain paraffins, highly-branched chain paraffins and olefins, it is possible to first treat the mixture with thiourea to remove the highly-branched chain paraffins in the form of their thiourea plexads and thereafter treat the remaining hydrocarbons with urea to effect separation of the straight chain paraffins and olefins. It will be understood that the same mixture can be plexated first with urea and then with thiourea.

I claim:
1. A process for the fractionation of a mixture containing a straight chain aliphatic compound (I) having at least six carbon atoms in the chain and a straight chain aliphatic compound (II) having at least six carbon atoms in the chain and having a lesser degree of carbon-carbon saturation than (I), which comprises: contacting said mixture with urea under conditions appropriate for the formation of a crystalline complex of urea and said compound (I), said compound (II) having a lesser capacity to form a urea complex under such conditions, and separating the said complex from the resulting reaction mixture.

2. A process for the fractionation of a mixture containing a straight chain hydrocarbon (I) having at least six carbon atoms in the chain and a straight chain hydrocarbon (II) having at least six carbon atoms in the chain and having a lesser degree of carbon-carbon saturation than (I), which comprises: contacting said mixture with urea under conditions appropriate for the formation of a crystalline complex of urea and said hydrocarbon (I), said hydrocarbon (II) having a lesser capacity to form a urea complex under such conditions, and separating the said complex from the resulting reaction mixture.

3. A process for the fractionation of a mixture containing a straight chain paraffin (I) having at least six carbons in the chain and a straight chain mono-olefin (II) having at least six carbon atoms in the chain and having the olefin group thereof relatively centrally positioned in the chain, which comprises: contacting said mixture with urea under conditions appropriate for the formation of a crystalline complex of urea and said paraffin (I), said olefin (II) having a lesser capacity to form a urea complex under such conditions, and separating the said complex from the resulting reaction mixture.

4. The method for concentrating n-octane from a mixture of n-octane and n-octene-1, which comprises: contacting said mixture with urea under conditions appropriate for the formation of a crystalline complex of urea and said n-octane; separating said complex from the resulting reaction mixture; decomposing said complex to set free n-octane in more concentrated form than in said first-mentioned mixture.

5. The method for concentrating n-tetradecane from a mixture of n-tetradecane and n-tetradecene, which comprises: contacting said mixture with urea under conditions appropriate for the formation of a crystalline complex of urea and said n-tetradecane; separating said complex from the resulting reaction mixture; decomposing said complex to set free n-tetradecane in more concentrated form than in said first-mentioned mixture.

References Cited in the file of this patent

UNITED STATES PATENTS 2,499,820   Fetterly _____ Mar. 7, 1950